United States Patent [19]
Sturtevant

[11] 3,833,943
[45] Sept. 10, 1974

[54] DISPOSAL SYSTEM UTILIZED WITH A HEAT SOURCE

[76] Inventor: Paul A. Sturtevant, 3880 W. Riverside Dr., Fort Myers, Fla. 33901

[22] Filed: July 10, 1972

[21] Appl. No.: 270,076

[52] U.S. Cl............................. 4/10, 4/131, 4/114, 210/152
[51] Int. Cl. ... E03d 11/02, E03d 11/00, B60r 16/04
[58] Field of Search ................ 4/131, 118, 10, 114; 210/152, 181, 173, 180

[56] References Cited
UNITED STATES PATENTS

| | | |
|---|---|---|
| 2,565,720 | 8/1951 | Collison et al............................ 4/131 |
| 3,342,337 | 9/1967 | Reid.................................... 210/152 |
| 3,586,170 | 6/1971 | Reid.................................. 210/152 X |
| 3,612,278 | 10/1971 | Dieterich............................. 210/152 |
| 3,615,010 | 10/1971 | Reid et al. ........................... 210/152 |
| 3,721,346 | 3/1973 | Lore et al. ........................... 210/152 |
| 3,733,617 | 5/1973 | Bennett..................................... 4/10 |

*Primary Examiner*—Henry K. Artis
*Attorney, Agent, or Firm*—Malin & Haley

[57] ABSTRACT

An effluent disposal system for use in conjunction with a high temperature heat source in which waste material is mascerated and meterably discharged into the source of heat as a function of heat source operating conditions such as pressure or temperature, thus insuring the most efficient waste disposal throughout the complete heat source operating range.

9 Claims, 3 Drawing Figures

DISPOSAL SYSTEM UTILIZED WITH A HEAT SOURCE

BACKGROUND OF THE INVENTION

This invention relates generally to a waste disposal system utilizing a source of intense heat for efficient waste eradication and removal, sterilization and calcination. It is specifically intended for use on vehicles such as mobile homes, mobile travel trailers, boats, motor coaches, aircraft, and the like. Up to the present, waste disposal systems have been utilized in which a constant volume of effluent is discharged directly into an internal combustion engine exhaust stream regardless of the power output. The maximum amount of effluent that may be sterilized and calcinated is dependent upon the temperature of the heat source and flow. The exhaust temperature (and pressure) of an internal combustion engine varies with engine power output. With a constant volume effluent flow disposal system, the correct amount of effluent for most efficient treatment is not received by a variable heat source such as an internal combustion engine operating in a wide power range. In another system, control device has been utilized which initiates the waste flow at a predetermined threshold value of vehicle speed, again disregarding engine operating conditions. No system provides for complete and efficient waste disposal operable as a function of the heat source condition.

BRIEF DESCRIPTION OF THE INVENTION

An effluent disposal system for use with a varying heat source for sterilizing and calcinating effluent comprising an effluent receiving tank, means for mascerating the effluent, pump means, a heat source having a varying temperature, main conduit coupling said tank, said mascerating means, and said pump to said heat source, a metering device coupled in said main conduit, a return conduit from said metering device to said tank for returning mascerated effluent back to said tank, a sensing device coupled between said exhaust line and said metering device for controlling the metering device thereby providing a quantity of mascerated effluent into the heat source as a function of a particular physical characteristic of the heat source, such as either pressure or temperature, and a heat source exhaust line for the sterilized and calcinated residue. When conditions are not advisable to discharge effluent into the heat source, such as at low temperature or pressure, the metering means receives information from the sensor relating such condition and the pumped, mascerated effluent is returned back into the tank. As the pressure or temperature increases, the system will provide a metered amount of effluent into the heat source as a function of temperature intensity. The meter control device (sensor) may be either a pressure sensitive or temperature sensitive device that returns a mechanical or electrical signal to the metering device relating the condition of the heat source.

It is an object of this invention to provide an improved effluent waste disposal system.

It is another object of this invention to provide a disposal system for use in a mobile environment such as travel trailers, boats, motor homes, and the like which utilize an internal combustion engine.

And yet another object of this invention is to provide an effluent disposal system in which the volume flow of mascerated effluent into the heat source is meterable controlled as a function of heat source disposal capacity.

And yet still another object of this invention is to provide a vehicle waste disposal system coupled to the exhaust line of the vehicle in which the optimum amount of effluent is discharged into the exhaust line for disposal into the atmosphere as a function of the exhaust heat and flow.

In accordance with these and other objects which will be apparent hereinafter, the instant invention will now be described with particular reference to the accompanying drawings.

PREFERRED EMBODIMENT OF THE INVENTION

Figure 1:
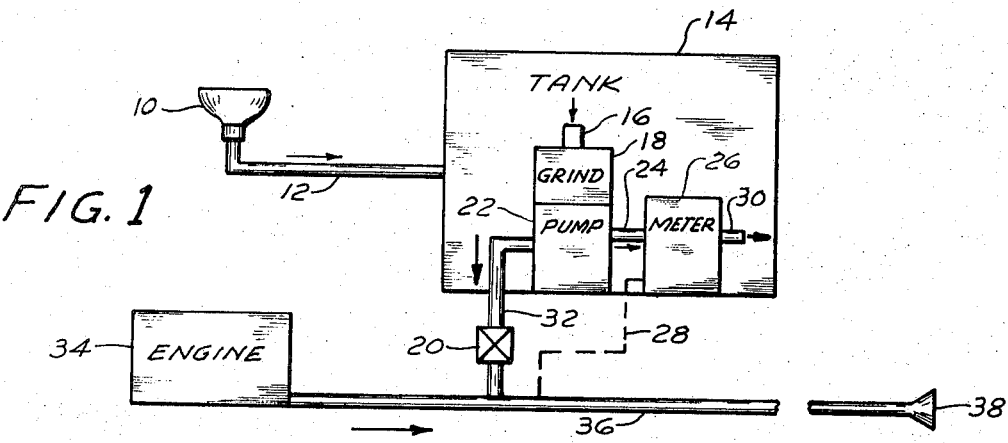
FIG. 1 is a schematic diagram of applicant's invention.

Referring now to the drawings, especially FIG. 1, applicant's invention is shown schematically having a regular toilet 10 coupled by conduit 12 to the effluent storage tank 14. Coupled to the tank 14 by conduit 16 is an effluent grinder 18 the output being connected to the input of positive pump 22. Mascerated effluent is pumped through conduit 24 into a metering valve 26 with output 30 emptying in the tank 14. The metering valve 26 includes a sensing device attached to the exhaust line 36 by coupling 28 which may either be electrical or mechanical. Exhaust line 36 beings at combustion engine 34 and exits into the atmosphere at flanged end portion 38. The pump 22 is also coupled to the exhaust line 36 by conduit 32. A one-way check valve 20 prevents exhaust gases in exhaust line 36 from entering the pump 22. The meter 26 controls the pressure head in the pump 22 such that when the valve is open mascerated effluent passes from the pump through the meter 26 and back into the tank resevoir. When the meter valve is in any other position than full open, pressure will increase in the pump output chamber (as a function of valve position) forcing mascerated effluent through conduit 22 into exhaust line 36 where it is sterilized and calcinated. The sensor 28 determines the condition of the exhaust pressure or temperature in exhaust line 36 and adjusts the meter valve 26 to provide the proper amount of flow of effluent through return conduit 30. When the meter valve is closed, all the mascerated effluent flows into the exhaust line 36.

The intense heat of the exhaust gases sterilized and calcinates the mascerated particles, reducing them to a harmless, fine powder that is discharged into the atmosphere.

Figure 2:
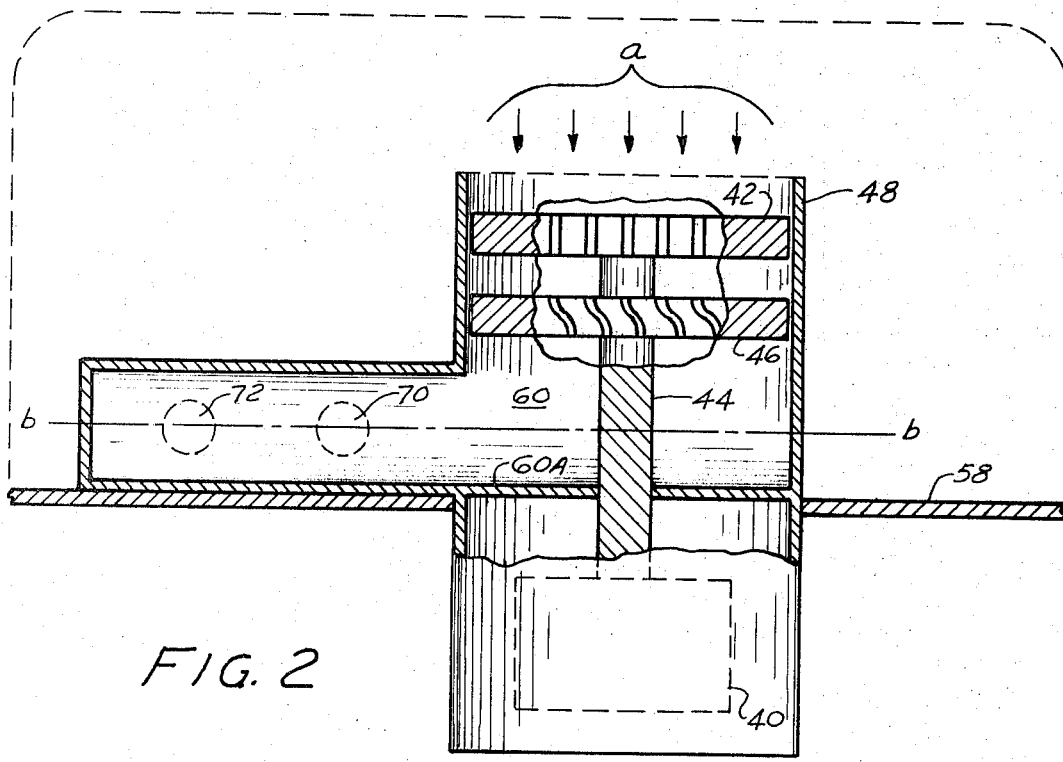
FIG. 2 shows the particular embodiment of applicant's invention in partial vertical cross-section.

The preferred embodiment, including the sensing and metering devices, is shown in FIG. 2. Cylindrical housing 48 contains a grinder 42 connected by shaft 44 to pump blade 46, all being coupled to a motor 40 (dotted). The open end of housing 48 (arrow "a" showing flow) is submerged inside the tank 58. The housing 48 is shown having a first portion contained inside tank 58 with the remainder being located outside tank 58 with an appropriate seal (not shown) to prevent leakage between the housing 48 and the aperature in the tank 58. Fluid inside chamber 60 is prevented from reaching motor 40 by chamber wall 60A.

The circular grinder 42 has a plurality of teeth spaced about its circumference. Effluent is drawn to the circumference of the grinding blade by pressure created by the pump 46, where the rotational action of the grinding blade mascerates the effluent. Rotating pump 46 draws the mascerated effluent into chamber 60.

Figure 3:
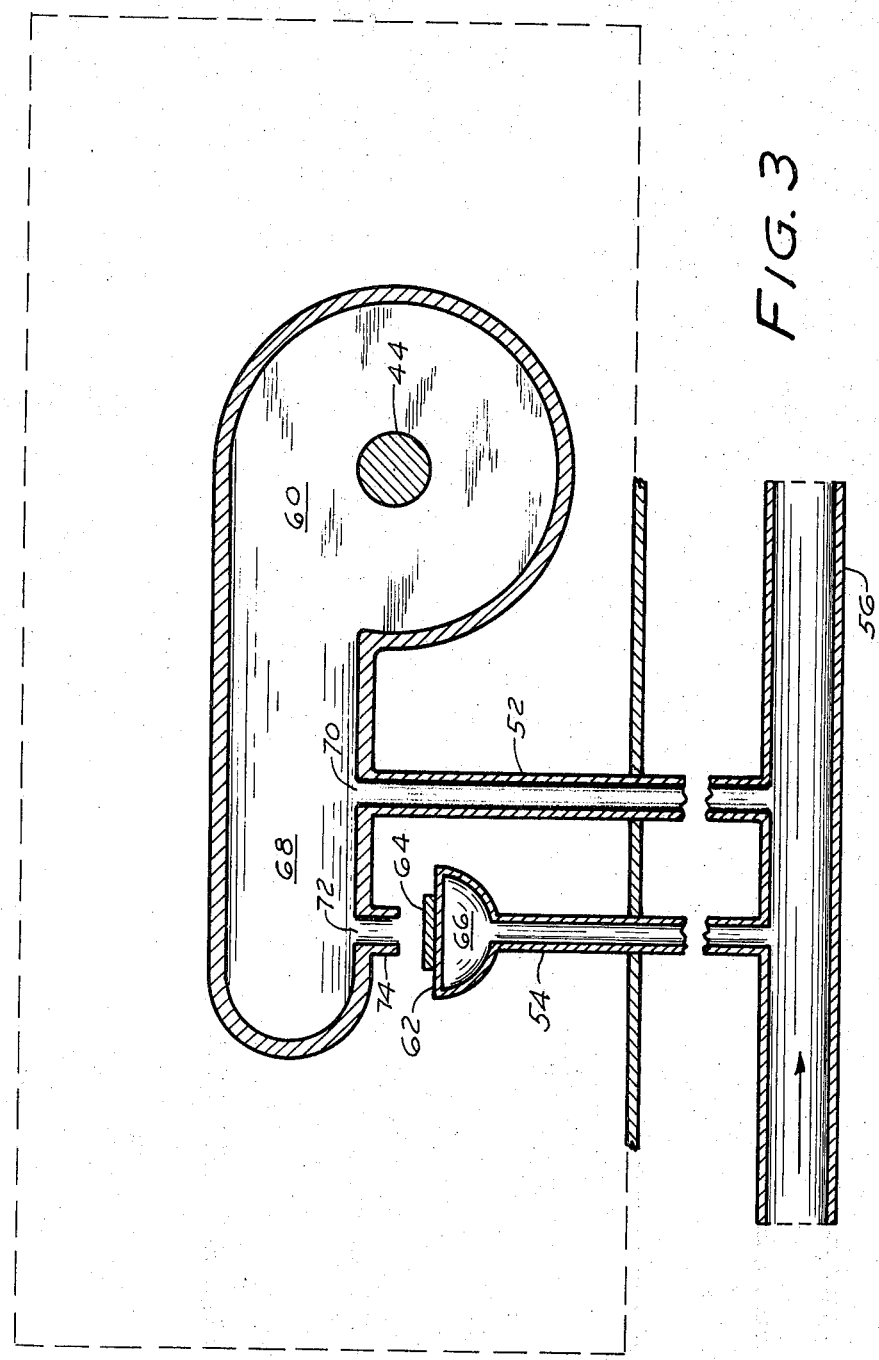
FIG. 3 shows the practical embodiment of applicant's invention in horizontal cross-section through line b—b of FIG. 2.

FIG. 3 shows chamber 60, where the mascerated effluent is discharged by the pump and continues into chamber 68 under pressure. The effluent may then be discharged through one of two openings in the housing, namely exhaust line discharge opening 70 or tank return opening 72, dependent upon the position of diaphragm 62 and valve 64. Exhaust gas pressure from an internal combustion engine in the exhaust pipe 56 communicates through conduit 54 into diaphragm chamber 66, where it acts upon the elastic diaphragm 62. If the force on valve 64 from the exhaust pressure in chamber 66 is greater than the surrounding forces from fluid pressure within tank 58 and fluid pressure of effluent exiting through exhaust 72, the diaphragm 62 will be forced toward the tank return opening 72. As the valve plate 64 gets closer to the tank return conduit 74, pressure within chamber 68 on the effluent will increase. As the effluent pressure increases in chamber 68, effluent pressure is greater that exhaust pressure in conduit 52, and effluent will begin flowing out through conduit 52 under pressure. The amount of effluent flowing through the conduit 52 will be a function of and is determined by the position of valve plate 64 in relation to the tank return opening across conduit 74. When the engine is at idle (lowest power output) the diaphragm 62 and valve plate 64 will be farthest from closing conduit 74 which thereby permits minimum flow of effluent out through conduit 74 back into the tank. Because of the exhaust pressure in conduit 52, minimum effluent will flow out into the exhaust line. The diaphragm 62 being responsive to the engine exhaust pressure and therefore regulating the return flow of effluent back into the tank will thus meterably regulate the amount of effluent flowing through conduit 52 into the exhaust line 56. Thus the power output which controls exhaust pressure will thus be used to properly meter the correct amount of effluent into the exhaust stream that can be reasonably calcinated. In order for effluent to flow into conduit 52, the exhaust pressure in conduit 52 must be overcome by a larger pressure created in chamber 68, caused by closing valve 64. This insures maximum efficiency of operation regardless of the power setting of the vehicle. For example, a vehicle in low gear going up a hill at a high power output setting, although at low vehicle speed, would be able to utilize the maximum tank output, while conversely, proceeding downhill at low power setting, only a small amount of effluent will be discharged into the exhaust line. It is especially important in view of pollution requirements that excessive amounts of effluent are not discharged into the exhaust stream when it is not capable of calcinating the mascerated effluent.

Returning to FIG. 2, openings 72 and 70, return line and effluent output respectively are shown protruding through tank housing 58. A proper seal is provided about each conduit through the tank to insure that the tank does not leak.

In operation, the pump 46 may be turned on at anytime that the vehicle motor is running. The diaphragm size, and therefore the pressure necessary to move the valve plate 64 is chosen sufficiently large to provide pressure above atmospheric thereby insuring the proper quantity of effluent for a particular power setting. If, for example, (FIG. 3) the exhaust pressure in conduit 52 and across effluent discharge opening 70 were one pound, then for effluent to be discharged out the opening 70, the pressure head in chamber 68 (above one pound) would have to be determined and provided by proper location of the diaphragm and valve plate 64 across the return opening 72. The pump output in volume flow remains constant at all times during operation.

The exact or particular amounts will be a function of the size of the pump, the conduits and other factors which will determine the pump mixture and ratio between effluent discharge and the vehicle engine exhaust.

Although shown as a pressure sensitive diaphram, the sensing device could be replaced by a thermostatic control device that would open and close the valve 64 as a function of the temperature of the exhaust.

Overall system efficiency is also increased through the re-masceration of effluent that is returned to the tank when the heat source is not at maximum.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An effluent waste disposal system comprising: effluent collection tank;
   means in communication with said tank for mascerating said effluent;
   heat source for sterilizing and calcinating said mascerated effluent; and
   means in communication with said mascerating means and said heat source, for meterably discharging a particular volume of said mascerated effluent into said heat source as a function of a particular operating parameter of said heat source.

2. An effluent waste disposal system comprising: effluent collection tank;
   means in communication with said tank for mascerating said effluent;
   heat source for sterilizing and calcinating said mascerated effluent;
   means in communication with said mascerating means and said heat source, for meterably discharging a volume of said mascerated effluent into said heat source as a function of a particular operating parameter of said heat source; and
   means in communication with said discharge means and said tank to return mascerated effluent not discharged into said heat source back to said tank.

3. An effluent disposal system as in claim 2, wherein said discharging means includes:
   pump connected in flow communication with said mascerating means and said heat source;
   meterable valve coupled between said pump and said heat source; and
   control means coupled to said meterable valve and said heat source.

4. An effluent disposal system as in claim 3, wherein said heat source includes:
internal combustion engine exhaust line.

5. An effluent disposal system as in claim 4, wherein said control means includes:
pressure sensitive control member moveable in response to engine exhuast pressure and coupled to said meterable valve.

6. An effluent disposal system as in claim 4, wherein said control means includes:
temperature sensitive control arm moveable in response to engine exhaust gas temperature and coupled to said meterable valve.

7. An effluent disposal system as in claim 5, wherein said control means includes:
a pressure sensitive diaphram providing a pressure sensitive elastic diaphragm;
a chamber in communication with said exhaust line, said diaphragm forming a wall of said chamber, and
valve plate coupled to said diaphragm and moveable across the return line opening as a function of diaphragm expansion.

8. An effluent waste disposal system comprising: effluent collection tank;
a means in communication with said tank for mascerating said effluent within said tank;
heat source for sterilizing and calcinating said mascerating effluent connected to said tank;
heat source parameter condition indicating means connected to said heat source; and
fluid flow metering means for variably regulating the volume of mascerated effluent fluid flow from said tank to said heat source, said meter means connected to said heat source parameter condition indicating means, whereby the volume of mascerated effluent flow into said heat source is a function of said heat source parameter condition indicating means.

9. An effluent waste disposal system comprising:
mascerated effluent collection tank;
heat source for sterilizing and calcinating said mascerated effluent; and
means for meterably connecting said collection tank to said heat source for providing a volume of effluent flow between said collection tank and said heat source as a function of a particular operating parameter of said heat source and wherein said metering means includes a pressure sensing means connected to said heat source whereby the volume of effluent received by said heat source from said collection tank is a function of the pressure within said heat source.

* * * * *

UNITED STATES PATENT OFFICE
CERTIFICATE OF CORRECTION

Patent No. 3,833,943      Dated September 10, 1974

Inventor(s) Paul A. Sturtevant

It is certified that error appears in the above-identified patent and that said Letters Patent are hereby corrected as shown below:

Column 3, line 36, the word "minimum" should read --maximum--.

Signed and sealed this 18th day of February 1975.

(SEAL)
Attest:

RUTH C. MASON  
Attesting Officer

C. MARSHALL DANN  
Commissioner of Patents  
and Trademarks